United States Patent [19]

Ripin et al.

[11] Patent Number: 4,597,933

[45] Date of Patent: Jul. 1, 1986

[54] RADIATIVE OPACITY AND EMISSIVITY MEASURING DEVICE

[75] Inventors: Barrett H. Ripin, Silver Spring; Robert R. Whitlock, College Park, both of Md.

[73] Assignee: The United States of America as represented by the Secretary of the Navy, Washington, D.C.

[21] Appl. No.: 500,127

[22] Filed: Jun. 1, 1983

[51] Int. Cl.⁴ .......... G01T 1/36

[52] U.S. Cl. .......... 376/153; 356/318

[58] Field of Search .......... 250/372; 356/316, 318; 376/143, 152, 153

[56] References Cited

U.S. PATENT DOCUMENTS

| | | | |
|---|---|---|---|
| 3,817,622 | 6/1974 | Billman et al. . | |
| 4,058,486 | 11/1977 | Mallozzi et al. | 376/152 |
| 4,142,088 | 2/1979 | Hirsh | 376/152 |
| 4,191,475 | 3/1980 | Sourrouille . | |
| 4,290,847 | 9/1981 | Johnson et al. | 376/152 |
| 4,298,797 | 11/1981 | Bernard et al. | 250/372 |
| 4,300,834 | 11/1981 | Demers et al. . | |
| 4,322,165 | 3/1982 | Ellebracht et al. | 250/372 |
| 4,432,933 | 2/1984 | Teitel et al. | 376/152 |
| 4,464,413 | 8/1984 | Murphy et al. | 376/152 |

FOREIGN PATENT DOCUMENTS 0156844 12/1980 Japan .......... 376/143

OTHER PUBLICATIONS

1975 IEEE/OSA Conference on Laser Engineering and Applications, p. 44.

Monjes et al., "Reflection-Transmission Phase Shift: Interferometer and Viewing Optics," Applied Optics, vol. 21, No. 10, 5/15/82.

Bastiaans, Applied Optics, vol. 19, No. 2, 1/15/80.

*Primary Examiner*—Deborah L. Kyle
*Assistant Examiner*—Richard W. Wendtland
*Attorney, Agent, or Firm*—Robert F. Beers; Sol Sheinbein; Charles E. Krueger

[57] ABSTRACT

An apparatus for measuring the emissivity and opacity coefficients of a test plasma. The apparatus includes a target comprising a support structure of a carrier material with an asymmetrical sample of a test material disposed thereon, a driver for ionizing the test material into a test plasma and the carrier material into a carrier plasma, and spectrographs for measuring the intensity of photons traversing said test plasma. Embodiments including a separate photon source are also disclosed.

56 Claims, 20 Drawing Figures

FIG. 4A
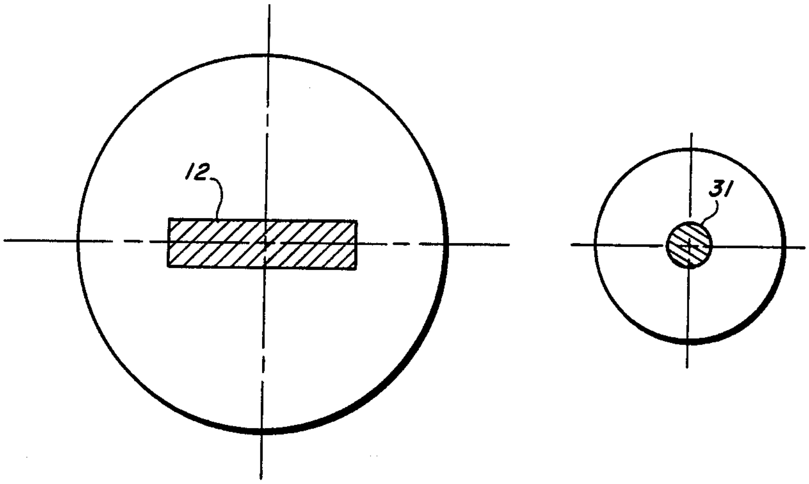
FIG. 4B
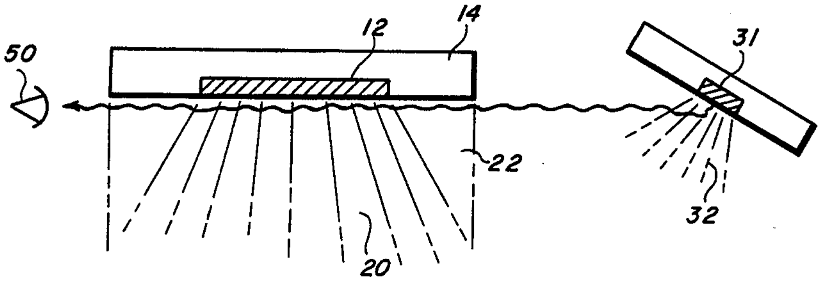
FIG. 5A
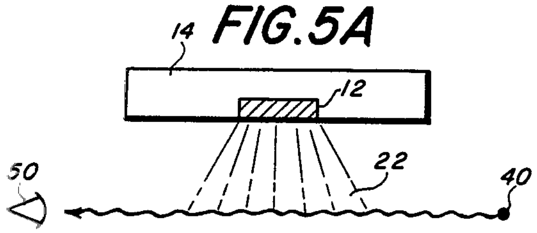
FIG. 5B
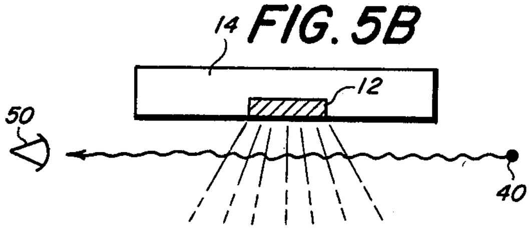
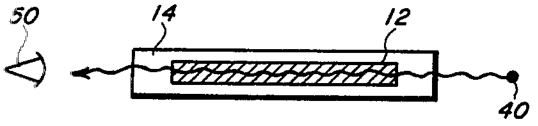
FIG. 5C
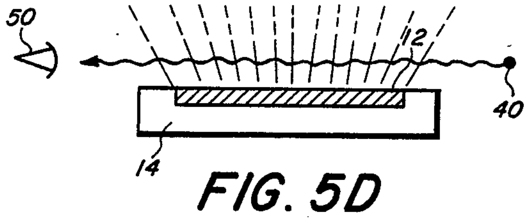
FIG. 5D
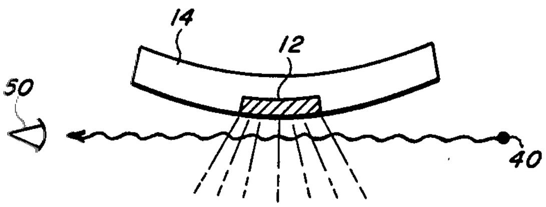
FIG. 5E
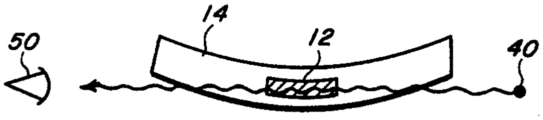
FIG. 5F Before detonation of high-explosive 60.

After detonation of high-explosive.

RADIATIVE OPACITY AND EMISSIVITY MEASURING DEVICE

BACKGROUND

1. Field of the Invention

The invention relates generally to measuring optical characteristics of plasmas and more particularly to measuring opacity and emissivity coefficients of a dense plasma.

2. Description of the Prior Art

There is a growing class of technical applications of plasmas that requires an accurate determination of the emissivity and absoption of the plasma utilized. Examples of these applications include: impoving the radiation environment of laser-driven nuclear fusion reactions, developing X-ray lasers, testing the effectness of laser weapons, and processing of materials.

Spectroscopic methods are utilized to measure the emissivity and absorption of plasmas. The emissivity coefficient of the plasma is a measure of the rate at which photons are emitted by the plasma. Similarly, the absorption coefficient is a measure of the rate at which photons are absorbed by the plasma. A major drawback of the accuracy of existing measurement techniques is the need to average over plasma temperature and density gradients. Computational techniques have been developed to average over these gradients but they are generally uneconomical and inaccurate.

Additionally, for a dense plasma these measurements are complicated by the self absorption of the plasma. The emissivity and absorption coefficients in the plasma may not be independently measured in a nonuniform plasma if the absorption is significant as in a dense or optically thick plasma.

OBJECTS OF THE INVENTION

Accordingly, it is an object of the present invention to measure the opacity and emissivity coefficients of a plasma without requiring significant averaging over density and temperature gradients.

It is a further object of the present invention to measure these coefficients for a high density plasma.

SUMMARY OF THE INVENTION

The above and other objects are achieved in the present invention which comprises a method and apparatus for measuring opacity and emissivity coefficients of a test plasma. The apparatus includes a target comprising a support structure of low absorptivity (low-Z) carrier material with a sample of a test material disposed thereon. In some embodiments a separate sample of a source material is also disposed on the same or a different target. This source material may be the same or different than the target or may be omitted.

The apparatus also includes a driver, such as a focused laser, electron or ion beam, to transform the target into a test plasma, a carrier plasma, and, when a source sample is present, a source plasma for emitting source photons. Photons emitted by the test plasma are designated test photons.

The test material is asymmetrically disposed on the support structure to provide a long and a short path for test and source photons to traverse. Imaging spectrographs (e.g. X-ray, XUV) are positioned to measure the intensity of the test or source photons which traverse the long and short paths through the test material. These dual measurements allow the opacity and emissivity coefficents to be calculated from the ratios of the spectral intensities recorded by the spectrographs. Thus, the apparatus is adapted for use in calculating these coefficients from spectral intensity data. The test plasma density and temperature can also be obtained with the spectrographs, using standard spectroscopic techniques (Griem, *Plasma Spectroscpy* McGraw Hill, New York 1964), or by other means.

When the target is transformed into the plasma state the test material plasma is collisionally confined by the plasma formed from the carrier material. The carrier plasma forms a thermodynamic bath around the test plasma so that the cross-sectional temperature and density of the test plasma is nearly uniform. This uniformity obviates the need for averaging over lateral gradients. Additionally, the imaging property of the spectrographs obviates the need for averaging over gradients normal to the target. Collimation may be substituted for imaging to achieve this purpose and is therefor considered as included in the term imaging. Several embodiments are described where the relative positions of the source sample, test sample, and spectrographs are varied.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 4A–4B are a top and cross sectional view, respectively, of a test sample/source sample configuration energized by separate laser beams.

FIGS. 5A–5J are schematic diagrams depicting source/test sample/spectrometer.

DETAILED DESCRIPTION OF THE PREFERRED EMBODIMENTS

The present invention is novel and improved apparatus and method for measuring the emissivity and absorption coefficient of a test plasma. A plasma as defined here includes any fully or partially ionized material. The term test plasma is also generalized here to include nonionized material with its physical state altered by external means.

The test plasma both emits and absorbs photons. The measurement of the emissivity and absorption coefficients of the test plasma requires techniques to isolate these two effects. The photons measured by the detector that were emitted by the test plasma are designated test photons. Such test photons traverse the test plasma, to enter a region outside the test plasma. In some of the embodiments described below a source of photons separate from the test plasma is included. Photons from this separate source that traverse the test plasma and are measured by the detector are designated source photons. Such source photons enter the region outside the test plasma.

Figure 1:
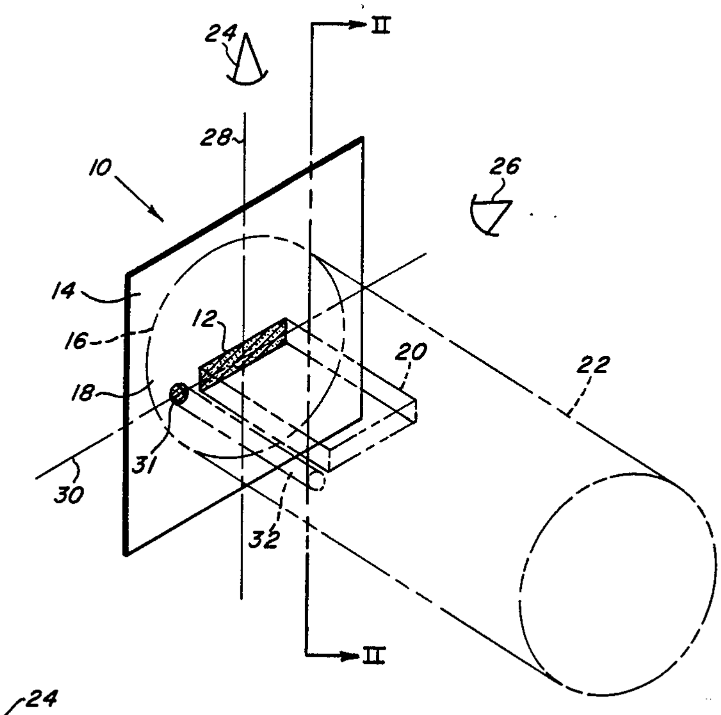
FIG. 1 is a schematic diagram of a preferred embodiment.

Referring now to the drawings, wherein like reference numerals designate identical or corresponding parts throughout the several views, and more particularly to FIG. 1 thereof, a target 10 including a sample of test material 12 disposed on a support structure of carrier material 14 is depicted. In FIG. 1 the sample of test material 12, e.g. aluminum, is a rectangle. When the sample is energized, for example by a high-power laser beam, ions ablated from the test sample stream to the right in FIG. 1 and form a test plasma 20. A section 18 of the carrier material within a focused laser beam 16 is also ionized to form a carrier plasma 22 which streams to the right in FIG. 1 and laterally surrounds the test plasma 20. The dimensions of the carrier plasma 22 are greater than the laterally surrounded test plasma 20 so that the carrier plasma 22 imposes a nearly uniform density and temperature across the test plasma 20. Photons emitted by the test plasma must traverse the test plasma and the carrier plasma before detection. Thus, the carrier plasma must be substantially transparent to these emitted photons.

The shape of the test and carrier plasmas depicted in FIG. 1 is schematic. In an actual case the plasmas would expand as they streamed to the right. It is understood that the sample of test material may be disposed upon either surface of the sheet of carrier material or embedded therein. The carrier, test, and sample materials may be in solid, liquid, or gaseous form. These various alternative placements are included in the term "on".

A pair of devices for measuring the intensity of photons emitted by and traversing through the test plasma are disposed along a thin axis 28 and a thick axis 30 of the test plasma 20. Typically these devices are realized by XUV spectrographs 24 and 26 disposed along the thin axis 28 and a thick axis 30, respectively, of the test sample 12.

In FIG. 1 the focused laser beam spot 16 is approximately $10^{-3}$ m in diameter. The test material 12 is the form of a rectangle approximately $20\times10^{-6}$ m by $300\times10^{-6}$ m. In this case only test photons emitted by the test plasma 20, which emanates from the test material 12, are present. These dimensions are exemplary only and do not limit the scope of the invention.

Additionally, a source sample 31, of the same or different material than the test sample, may be disposed on the support structure 14 within the boundary of the laser beam spot 16. When the spot 16 is irradiated a source plasma 32 laterally surrounded by the carrier plasma 22 emanates from the source sample 31 and emits source photons. The source may be utilized to provide photons in cases where the test plasma does not emit photons. Additionally, the source may be designed to vary temporal, spectral, spatial, polarization, and intensity distributions of source photons.

In an actual constructed embodiment, a test material of aluminum was deposited on a carrier material of plastic. The plastic was composed of low Z (atomic number) atoms carbon and hydrogen. Thus, the plasma formed by the plastic is optically transparent to the radiation emitted by the test plasma or by the source plasma. The deposition of the test material is accomplished by well-known techniques such as photolithography, vacuum deposition, and sputtering.

The concentration of the test material may be reduced by dilution with the carrier material or other optically transparent materials. This dilution is achieved by methods such as ion implantion of the test sample with the carrier material, geometric dilution such as forming the test sample into a checkerboard pattern with the carrier material or layering the test material with the carrier material, forming the test sample from a chemical compound including the test material, or by other means. Physical characteristics of the test plasma, such as the optical thickness and absorbtion coefficient, may be controlled by varying the test material concentration.

In some cases the ionizing driver beam is focused to a spot much larger than exemplified above. The above-described concentration reducing techniques allow the utilization of larger samples without excessive or total absorption in the test plasma due to the longer optical pathlengths.

The spectrographs utilized are well-known in the art. For example, x-ray spectrographs of the type described in an article by R. R. Whitlock et al. entitled "Spectrally Resolved Flash X Radiography of Laser Accelerated Targets", Proceedings of the $15^{th}$ International Congress on High Speed Photography and Photonics (SPIE. Vol. 348, Bellingham, Wa., p. 789–96; 1982) may be utilized.

The flow of the test plasma 20 is collisionally confined by the carrier plasma 22 if the ion-ion collision mean free paths are small compared to the dimensions of the test sample 12. This condition is almost always true for material ablation and ionization induced by laser irradiation.

The carrier plasma 22 establishes a nearly uniform density and temperature throughout the confined test plasma laterally surrounded by the carrier plasma. Note that the cross-sectional area of the test plasma is much less than the cross-sectional area of the carrier plasma. For a typical target the surface area ratio of test material to surrounding carrier material is on the order of $10^{-1}$ or less. Thus the carrier plasma 22 acts as a thermodynamic bath imposing a nearly uniform density and temperature throughout the test plasma 20.

Figure 2:
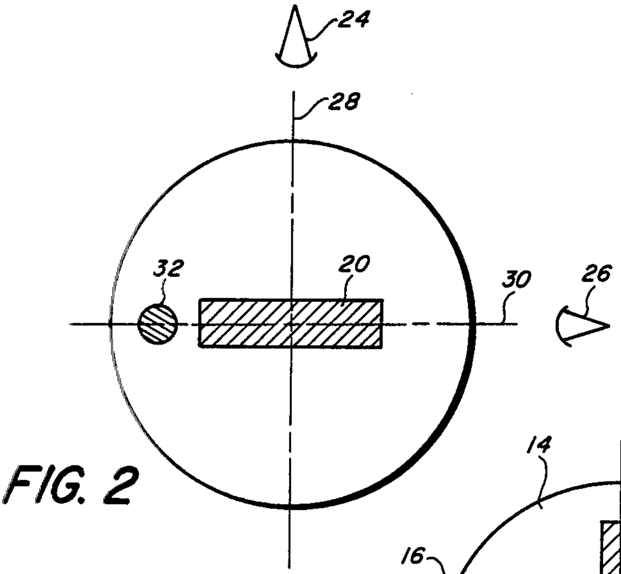
FIG. 2 is a cross-sectional view of the plasma depicted in FIG. 1. This view is in a plane parallel to the target located at the arrow II in FIG. 1.

This uniform density and temperature facilitates a simple and direct calculation of the emissivity and opacity coefficients of the test plasma. This calculation is described below with reference to FIG. 2. Turning now to FIG. 2, a cross sectional view of the plasma configuration in FIG. 1 is depicted. A carrier plasma 22 has a test and a source plasma 20 and 32 laterally confined therein. The source plasma 32 emanates from the source material 31 (FIG. 1). A first spectrograph 24 is aligned along the thin axis of the test plasma and second spectrograph 26 is aligned along the thick axis of the test plasma. The relative positions of the test and source plasmas may be varied or the separate source plasma may be eliminated. The function of the source plasma is to provide a source of photons to promote absorption or stimulated emission in the test plasma.

The test plasma ions both emit and absorb photons. If the cross-sectional dimension of the test plasma 20 is small enough that absorption is negligible then the plasma is optically thin. If absorption is significant then the plasma is optically thick.

For the plasma depicted in FIG. 2 the test plasma is optically thin along the thin axis and optically thick along the thick axis.

In order to calculate the emissivity of the test plasma no separate source plasma is required. The intensity, $I_1$, of photons measured by the first spectrograph 24 is:

$$I_1 = \int_0^{\Delta x} \epsilon dx \quad (1)$$

wherein $\epsilon$ is emissivity of the test plasma and $\Delta x$ is the thickness of the test plasma along the thin axis. Since uniform temperature and density prevail for the measurements, the emissivity is a constant so that:

$$I_1 = \epsilon \Delta x \quad (2)$$

Thus, the emissivity is equal to the measured intensity divided by the plasma material thickness, or $$\epsilon = I_1/\Delta x \quad (3)$$

Equation (3) may also be applied for stimulated emission in the presence of a uniform photon flux across the test plasma.

In order to calculate the absorption coefficient the intensity, $I_2$, measured by the second spectrograph disposed along the thick axis is utilized. First, the effective absorption coefficient, K, which includes the effects of both absorption and photon-stimulated emission, will be calculated for the case where no separate source plasma 32 is present. The magnitude of $I_2$ is given by $$I_2 = \int_0^{\tau} \epsilon/K \exp[-(\tau - \tau')] d\tau' \quad (4)$$

where $\tau$ is the optical depth or optical thickness, defined by $$\tau = \int_0^{x} K dx = Kx \quad (5)$$

with x being the dimension of the test plasma along the thick axis. Substituting for $\tau$, eq. (4) becomes $$I_2 = \int_0^{Kx} \epsilon/K \exp[-(Kx - Kx')] K dx' \quad (6)$$

or $$I_2 = \int_0^{Kx} \epsilon \exp[-(Kx - Kx')] dx' \quad (7)$$

where dx′ distance into the tracer from the end nearest the second spectrometer. The integral is then performed and evaluated with trial K's until the value of the integral is equal to the measured value of $I_2$.

Alternatively, differentiating eq. (6) results in $$\frac{dI_2}{dx} = \epsilon \exp[-(Kx - Kx')] \quad (8)$$

The quantity x′ may be varied by changing the thickness of the test plasma along the thick axis. Thus multiple measurement may be utilized to calculate K; these measurements may be made on shot by shot basis or on a single shot by an appropriate choice of test material geometry. The sensitivity of the measurements is enhanced if magnitude of the quantity $K(x-x')$ is about one. When $K(x-x')$ is equal to about one the optical thickness of the test plasma 20 is great enough to absorb enough photons to allow the measurement of K yet small enough to pass a measurable photon flux. The above-described test material dilution techniques may be utilized to vary the magnitude of $K(x-x')$ If a separate source plasma is present then the intensity, $I_4$ measured at the second spectrograph is the sum of the intensity of the test photons from the test plasma, $I_2$, and the intensity of the source photons emitted from the source plasma that traverse the test plasma, $I_3$. Note that frequency maxima of $I_2$ and $I_3$ may differ. Thus, when a separate source plasma is utilized $I_4$ is determined by the relationship:

$$I_4 = \int_0^{Kx} \epsilon \exp[-(Kx - Kx')] dx' + I_s \exp[-kx] \quad (9)$$

Where $I_s$ is the input intensity of source photons.

Figure 3A:
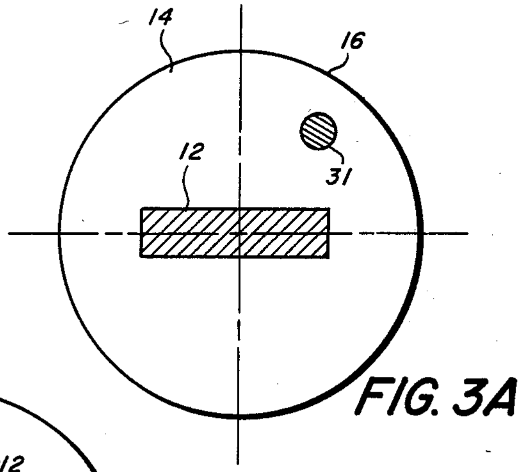
FIGS. 3A–3D are diagrams of various test sample/-source sample configurations disposed on the surface of the support structure.
Figure 3B:
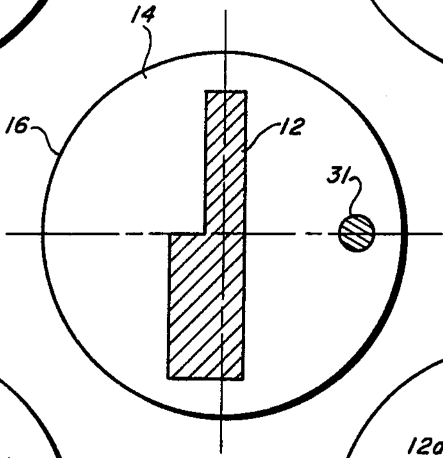
Figure 3C:
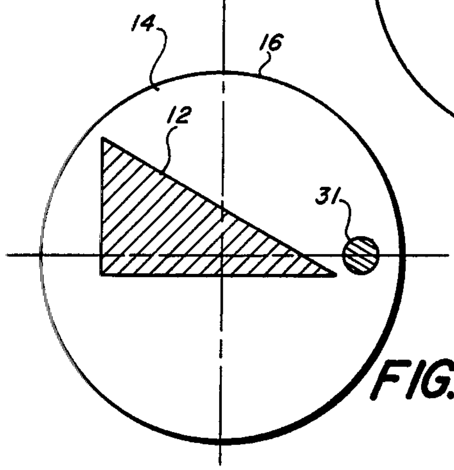
Figure 3D:
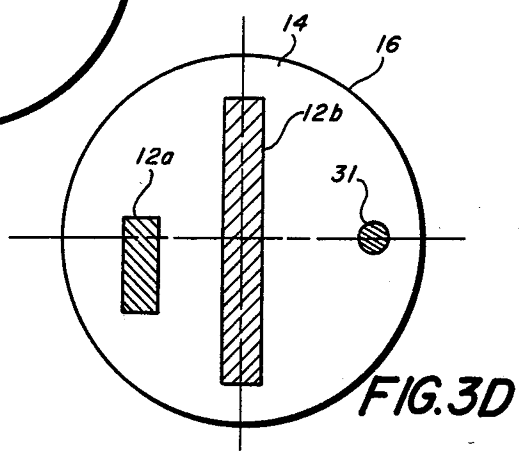

The source and test materials may be disposed on the sheet of carrier material in a variety of configurations. These alternatives are depicted in FIGS. 3A–3D, 4A–4B, and 5A–5J. Referring now to FIGS. 3A–3D, the test material 12 and separate source material 31 are disposed upon the surface of the support structure 14. In FIG. 3A the test material sample 12 is a rectangle. In FIGS. 3B and 3C the test material is shaped to facilitate differential thickness measurements. In FIG. 3D a first test sample **12*a* of a first material and a second test sample 12*b*** of a second material are utilized.

Referring now to FIGS. 4A and 4B, a top and side cross-sectional view, respectively, of a target configuration is presented. The source and test materials 31 and 12 are separated completely and irradiated by separate laser beam spots. As before, the source composition may be either the same as or different than the test material. In addition, the source plasma may be at a different temperature and have a different time duration than the test plasma. For example, in an actual embodiment the source material was irradiated by a 300 picosecond laser pulse with 30 joules of energy and the test material was irradiated by a 3 nanosecond pulse with 500 joules of energy.

Referring to FIGS. 5A–5J, various source-test-detector configurations are depicted where the test and/or source material 12 and/or 40 is embedded within the support structure of carrier material 14. The laser beam irradiating the test material is always incident on the lower surface of the support structure of carrier material 14. The source 40 and spectrographs 50 are positioned to measure the optical coefficients for different plasma conditions. The source 40 is generally a source plasma 32 (FIG. 1) emanating from a source sample 31 (FIG. 1). The support structure 14 may be nonplanar to provide further control over viewing geometry, plasma density, expansion cooling, and compression heating.

Figure 5G:
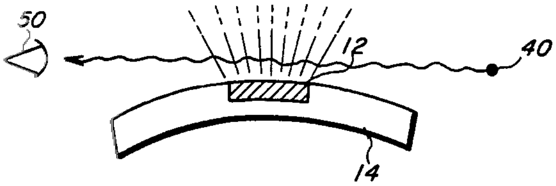
Figure 5H:
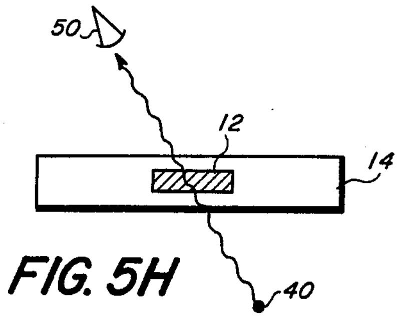
Figure 5I:
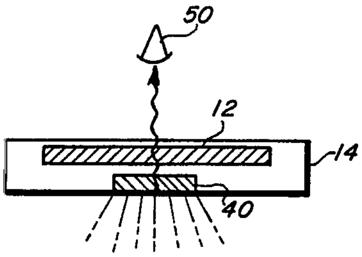
Figure 5J:
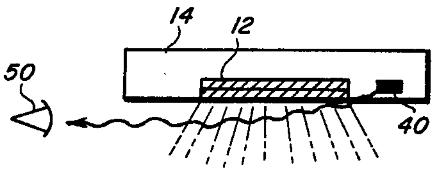

The embodiments depicted in FIGS. 5A and 5B illustrate that the test material density and temperature conditions may be varied by moving the intersection of the source-detector axis and test plasma normal to the target; highest temperature and density regions are often closest to the target surface as in FIG. 5B. The test material may be embedded within the carrier as in FIG. 5C or on the rear (non-irradiated) surface of the carrier material as shown in FIG. 5D. These configurations allow still different test plasma conditions to be reached, and measured; in FIG. 5C the test material is confined near solid density by the surrounding carrier material; in 5D the optical properties of the test plasma emanating from the rear surface are measurable. In embodiments where the test material is not directly exposed to the laser it is heated indirectly by: photons, shocks, conduction, particles, convection, and the like. Embodiments with curved carrier materials, as in FIGS. 5E–5G, allow measurements closer to the target surface (i.e., high-density) by minimizing the amount of high density carrier material in the source-detector line of sight. Also, curved targets alter the expansion or compression properties of the test plasma, and hence its density and temperature. The optical characteristics of high-density test plasma can be measured by orienting the source-detector axis through the embedded test material 12, such as illustrated in FIGS. 5H and 5I. Emission of photons from the source 40 can be delayed by burying it slightly below the surface of the carrier material as illustrated in FIG. 5J; thus, the source emits photons strongly only after the overlayer is ablated by the laser beam. Further control over the emission time of the source can be obtained by varying the thickness of the source material 40; after the source is completely ablated it will cease to emit. Therefore, some time-resolution can be obtained with the source and test material within the same laser focal spot.

The above-described embodiments utilize a focused laser beam to ionize the targets. However, several alternative means for ionizing the targets such as photons, shocks, conduction, particles, and convection may utilized. Specific examples of alternatives include: (1) an exploding wire or foil; (2) an electric arc (with or without an axial magnetic field); (3) a focused electron or ion beam; (4) radiation from a strong electromagnetic emitter such as a nuclear weapon, an x-ray generator, a synchrotron, a nuclear fusion machine, a flash UV source, a microwave generator; (5) impact excitation from a mass accelerator; (6) and chemical explosives.

Figure 6A:
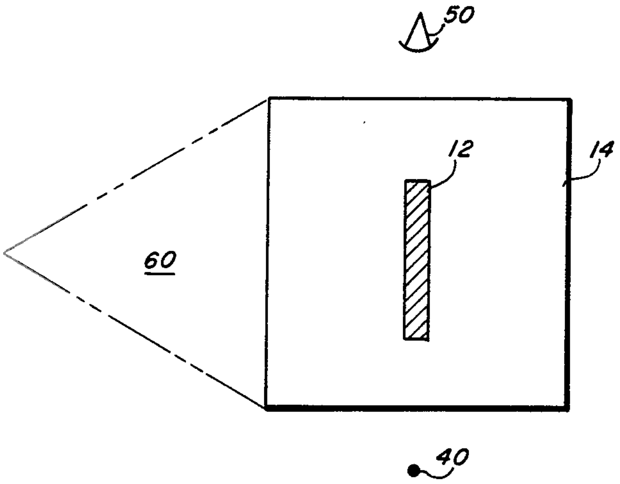
FIG. 6 is a schematic diagram of an embodiment utilizing a high-exposive driver.
Figure 6B:
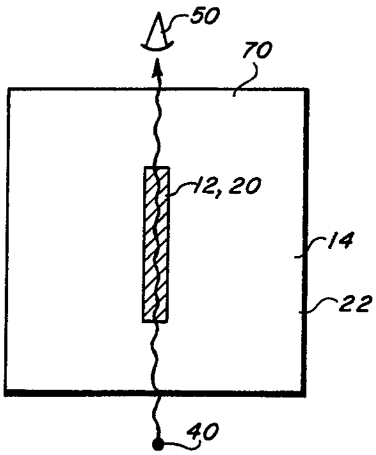

An example of an embodiment utilizing chemical explosives is depicted in FIGS. 6A–6B. Referring now to FIG. 6A a high-explosive driver 60, for example a shaped charge, is disposed next to a suppport structure 14 of carrier material with a test sample 12 embedded therein. A separate source sample 31 is disposed along a thick axis of the sample. FIG. 6B depicts the sample 12 within a shock wave 70 caused by detonation of the driver 60. The physical state of the test sample 12 is altered by the shock wave 70. The optical properties of this altered state are determined from measurements by a detector 50 of the photon flux from the source 40 traversing the test plasma 12.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An apparatus adapted for use in calculating opacity and emissivity coefficients of a test material ionized into a test plasma comprising:

first means for forming a test plasma from a test material which emits test photons;

second means for forming a carrier plasma laterally surrounding said test plasma for collisionally confining said test plasma and serving as a thermodynamic bath around said test plasma so that nearly uniform cross-sectional temperature and density of the test plasma is obtained; and third means for measuring intensity of test photons traversing said test plasma and said carrier plasma.

2. The apparatus recited in claim 1 wherein:

said second means includes a first support structure of low Z carrier material, where Z is the atomic number.

3. The apparatus recited in claim 2 wherein:

said first means includes a sample of test material disposed on said first support structure of optically transparent (low Z) carrier material in said second means.

4. The apparatus recited in claim 3 wherein:

said sample of test material is asymmetrical with a thin axis and a thick axis.

5. The apparatus recited in claim 4 wherein:

said test plasma is optically thin along said thin axis and optically thick along said thick axis.

6. The apparatus recited in claim 5 further icluding:

fourth means for emitting source photons to traverse said test plasma and said carrier plasma.

7. The apparatus recited in claim 6 wherein:

said fourth means includes a sample of source material disposed on said first support structure of carrier material.

8. The apparatus recited in claim 6 wherein:

said fourth means includes a sample of source material disposed on a second support structure of carrier material.

9. The apparatus recited in claim 7 wherein:

said first, second, and fourth means includes fifth means for ionizing said carrier material and said test and source materials into a plasma.

10. The apparatus recited in claim 9 wherein:

said fifth means includes a high power laser beam focused to a spot on said first sheet of carrier material, said samples of test and source materials being positioned within said spot.

11. The apparatus recited in claim 9 wherein:

said fifth means includes an electron beam focused to a spot on said first sheet of carrier material, said samples of test and source materials being positioned within said spot.

12. The apparatus recited in claim 9 wherein:

said fifth means includes an exploding wire with said first sheet of carrier material and said samples of test and source materials disposed thereon.

13. The apparatus recited in claim 5 wherein:

said third means includes means for detecting source photons traversing said test plasma along said thin and thick axes.

14. The apparatus recited in claim 13 wherein:

said third means includes a first XUV imaging spectrograph positioned along said thin axis and a second XUV imaging spectrograph positioned along said thick axis.

15. An apparatus adapted for use in calculating opacity and emissivity coefficients of a test plasma comprising:

a target including a support structure of a carrier material with an asymmetrically shaped sample of a test material disposed thereon, said asymmetrically shaped test sample with a thin axis and a thick axis;

first means for ionizing said target into a test plasma for emitting test photons and into a carrier plasma that laterally surrounds said test plasma to reduce temperature and density gradients of said test plasma; and a first spectograph for measuring the intensity of said test photons.

16. The apparatus recited in claim 15 further comprising:

a source of source photons for traversing said test plasma and said carrier plasma.

17. The apparatus recited in claim 16 wherein:

said first spectrograph is also for measuring the intensity of said source photons traversing said test plasma and said carrier plasma.

18. The apparatus recited in claim 15 wherein:

said first means includes a high-power laser beam focused to a spot on said target that entirely laterally surrounds said sample of test material.

19. The apparatus recited in claim 18 wherein;

said sample of test material is disposed within said focused laser beam spot.

20. The apparatus recited in claim 19 wherein:

said first spectrograph is disposed along said thin axis.

21. The apparatus recited in claim 20 further comprising:

a second spectrograph disposed along said thick axis.

22. A method adapted for use in calculating opacity and emissivity coefficients of a test plasma comprising the steps of:

ionizing a test material into a test plasma, forming the cross-section of said test plasma into an asymmetrical shape with a thin axis and a thick axis;

reducing the density and temperature gradients of said test plasma;

generating test photons for traversing said test plasma; and measuring the intensity of said test photons which have traversed said test plasma.

23. The method recited in claim 22 wherein:

said step of measuring the intensity of said test photons comprises:

the step of measuring the intensity said test photons traversing said test plasma along said thick axis.

24. The method recited in claim 23 wherein said step of measuring said test photons further comprises;

the step of measuring the intensity of said test photons traversing said test plasma along said thin axis.

25. The method recited in claim 22 wherein said step of gradient reducing comprises the step of:

ionizing a carrier material into a carrier plasma for collisionally confining said test plasma.

26. The method recited in claim 22 further comprising the step of:

generating source photons for traversing said test plasma; and measuring the intensity of said source photons which have traversed said test plasma.

27. The method recited in claim 26 wherein:

said steps of measuring the intensity of said test and source photons includes the step of measuring the intensity of said test and source photons traversing said test plasma along said thick axis.

28. The method recited in claim 27 wherein:

said steps of measuring the intensity of said test and source photons further includes the step of measuring the intensity of said test and source photons traversing said test plasma along said thin axis.

29. An apparatus adapted for use in calculating opacity and emissivity coefficients of a test material ionized into a test plasma, said apparatus comprising:

first means for forming a test plasma from a test material which emits test photons:

second means for forming a carrier plasma laterally surrounding said test plasma and serving as a theromodynamic bath around said test plasma so that nearly unifor cross-sectional temperature and density of the test plasma is obtained;

third means for forming a source plasma from a source material which emits source photons, said source plasma being laterally surrounded by said carrier plasma; and fourth means for measuring intensity of test photons and/or source photons traversing said test plasma and said carrier plasma.

30. The apparatus recited in claim 29 wherein:

said second means includes a first support structure of low Z carrier material, where Z in the atomic number.

31. The apparatus recited in claim 30 wherein:

said first means includes a sample of test material disposed on said first support structure of optically transparent (low Z) carrier material.

32. The apparatus recited in claim 31 wherein:

said sample of test material is asymmetrical with a thin axis and a thin axis.

33. The apparatus recited in claim 32 wherein:

said test plasma is optically thin along said thin axis and opticallly thick along said thick axis.

34. The apparatus recited in claim 33 wherein:

said third means includes a sample of source material disposed on said first support structure of low Z carrier material.

35. A mehod adapted for use in calculating opacity and emissivity coefficients of a test material ionized into a test plasma, comprising the steps of:

forming a carrier plasma laterally surrounding said test plasma thus collisionally confining said test plasma and serving as a thermodynamic bath around said test plasma so that nearly uniform cross-sectional temperature and density of the test plasma is obtained, and measuring intensity of test photons traversing said test plasma and said carrier plasma.

36. The method recited in claim 35 wherein:

said step of forming a carrier plasma includes using a first support structure of low Z carrier material, where Z in the atomic number.

37. The method recited in claim 36 wherein:

said step of forming a test plasma includes using a first support structure of optically transparent (low Z) carrier material and using a sample of test material disposed on said first support structure.

38. The method recited in claim 37 wherein:

the step of forming a test plasma includes using an asymetrical sample of test material having a thin axis and a thick axis.

39. The method recited in claim 38 wherein:

the step of forming a test plasma includes forming a test plasma that is optically thin along said thin axis and is optically thick along said thick axis 40. The method receited in claim 39 wherein:

the forming of said test plasma and carrier plasma includes ionizing said carrier material and said test material into a plasma wherein said carrier plasma laterally surrounds said test plasma.

41. The method recited in claim 40 wherein:

the ionizing of said carrier material and test material includes focusing a high power laser beam to a spot on the carrier material and positioning the sample of test material entirely within said spot.

42. The method recited in claim 35 wherein:

the step of measuring intensity of test photons traversing said test plasma and said carrier plasma includes detecting source photons traversing said test plasma and said carrier plasma along said thin and thick axes.

43. The method recited in claim 35 wherein:

the step of measuring the intensity of test photons traversing said test plasma and said carrier plasma includes positioning a first XUV imaging spectrograph along said thin axis and positioning a second XUV imaging spectrograph along said thick axis.

44. A method adapted for use in calculating opacity and emissivity coefficients of a test plasma, the method comprising the steps of:

providing a target including a support structure of a carrier material with an asymmetrically shaped sample of a test material disposed theron, said asymmetrically shaped test sample having a thin axis and a thick axis;

ionizing said target into a test plasma for emitting test photons and a carrier plasma laterally surrounding said test plasma for reducing temperature and density gradients of said test plasma; and using a first spectrograph for measuring the intensity of said test photons.

45. The method recited :n claim 44 further comprising:

providing a source of source photons for traversing said test plasma and said carrier plasma.

46. The method recited in claim 45 wherein:

the step involving said first spectrograph also involves measuring intensity of said source photons traversing said test plasma and said carrier plasma.

47. The method recited in claim 44 wherein:

the forming of a test plasma includes focusing a high-power laser beam to a spot on said target and disposing said sample of test material entirely within said spot.

48. The method recited in claim 47 wherein:

the step involving said first spectrograph involves disposing it along said thin axis.

49. The method recited in claim 48 further comprising the step of:

disposing a second spectrograph along said thick axis.

50. A method adapted for use in calculating opacity and emissivity coefficients of a test plasma, said method comprising the steps of:

ionizing a test material into a test plasma, forming said test plasma into an asymmetrical shape with a thin axis and a thick axis;

reducing density and temperature gradients of said test plasma by providing a carrier plasma laterally surrounding said test plasma;

generating test photons for traversing said test plasma and said carrier plasma; and measuring intensity of said test photons which have traversed said test plasma and said carrier plasma.

51. The method recited in claim 50 wherein:

said step of measuring the intensity of said test photons comprises:

measuring intensity of said test photons traversing said test plasma along said thick axis.

52. The method recited in claim 51 wherein said step of measuring said intensity of said test photons further comprises;

measuring the intensity of said test photons traversing said test plasma along said thin axis.

53. The method recited in claim 52 wherein said step of reducing gradients comprises:

ionizing a carrier material into a carrier plasma for collisionally confining said test plasma.

54. The method recited in claim 50 further comprising of:

generating source photons for traversing said test plasma and said carrier plasma; and measuring intensity of source photons which have traversed said test plasma and said carrier plasma.

55. The method recited in claim 54 wherein:

the measuring of the intensity of said test and source photons includes the measuring of the intensity of said test and source photons traversing said test plasma along said thick axis.

56. The method recited in claim 55 wherein:

the measuring of the intensity of said test and source photons further includes the measuring of the intensity of said test and source photons traversing said test plasma along said thin axis.

* * * * *